Aug. 19, 1969  J. A. HAMORI ET AL  3,461,776

TABLE EXTENSION FOR MACHINE TOOL

Filed June 9, 1967  4 Sheets-Sheet 1

INVENTORS
Julius Arpad Hamori
& Frank Denes
BY Polachek & Saulsbury
ATTORNEYS

INVENTORS
Julius Arpad Hamori &
Frank Denes
BY
Polachek & Saulsbury
ATTORNEYS

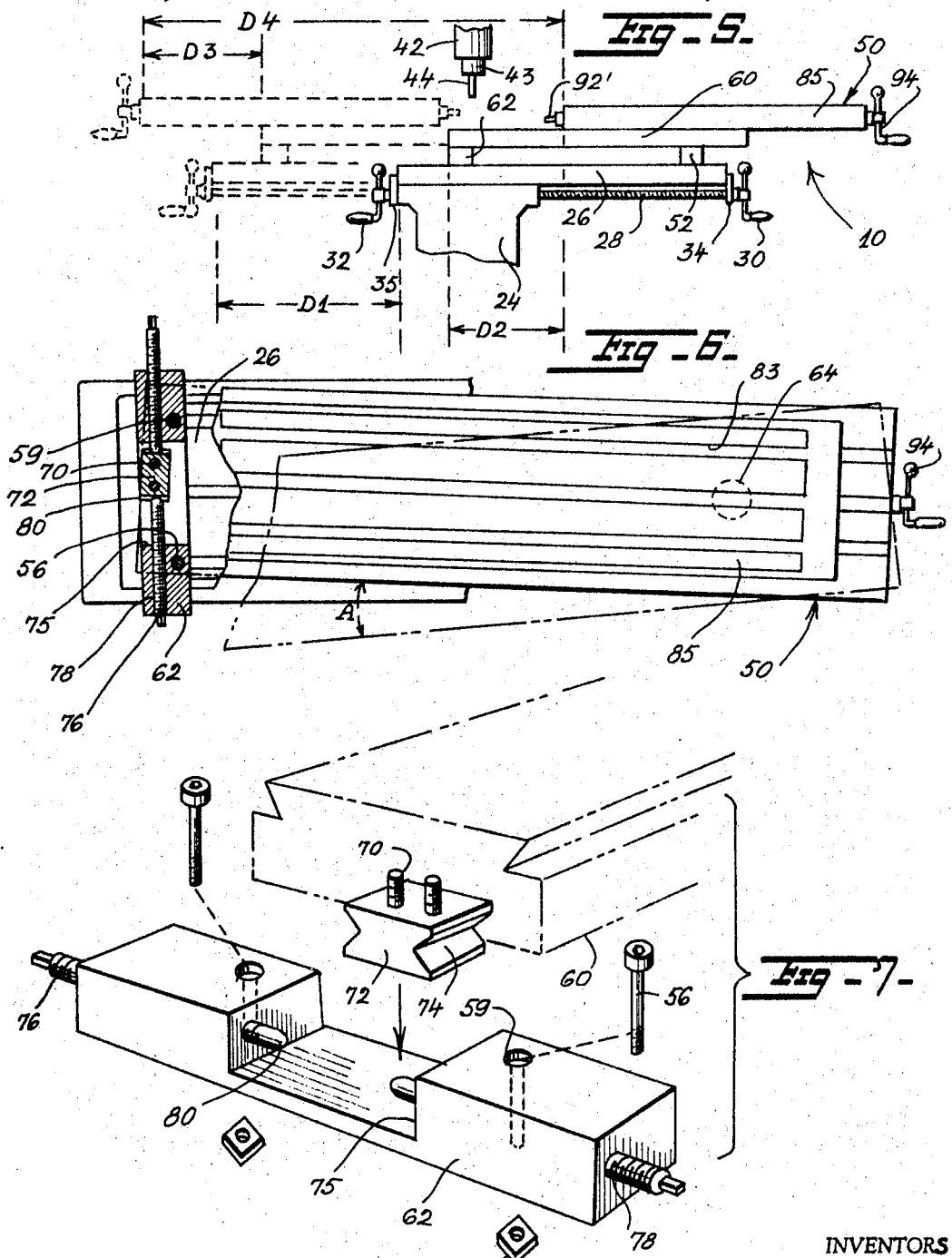

United States Patent Office 3,461,776
Patented Aug. 19, 1969

3,461,776
TABLE EXTENSION FOR MACHINE TOOL
Julius Arpad Hamori, Yonkers, and Frank Denes, Bronx, N.Y. (both of 278 Woodworth Ave., Yonkers, N.Y. 10701)
Filed June 9, 1967, Ser. No. 644,839
Int. Cl. B23d 7/08
U.S. Cl. 90—58                3 Claims

ABSTRACT OF THE DISCLOSURE

A longitudinally movable table for a machine tool such as a milling machine provided with a longitudinally movable extension for the table to extend the range of longitudinal movement of the table.

---

The invention relates to the art of machine tools and more particularly concerns a work table for a machine tool such as a milling, boring, drilling, tracing or similar machine having a horizontal, longitudinally movable work table.

Heretofore it has been conventional to provide a longitudinally movable work table for a machine tool such as a vertical milling machine. Such a table has a fixed length. The table is limited in longitudinal movement to approximately half its length. If work must be performed over a greater longitudinal distance than the limited travel of the work table, it is necessary to shift the work on the table. Sometimes this is not possible because of the size or shape of the work or the nature of the cut to be made. The only alternative heretofore has been to obtain a machine with a longer work table.

This is often prohibitively expensive. Where a shop or plant has only infrequent use for a long work table, it is uneconomic to provide a machine with such a table. Some machines are designed so that short tables can be removed and replaced by slightly longer ones. Such replacement is a rather difficult, time consuming matter, and at best it increases the working range only a few inches. When not in use, the longer or shorter tables must be stored in a safe place, which is often inconvenient where space is limited.

The present invention is directed at overcoming the above and other difficulties and disadvantages of machine tools having short work tables. According to the invention there is provided an upper auxiliary work table which is movably mounted upon the lower main work table of a milling machine or the like. The lower main work table can be moved longitudinally for its full range of adjustment, and then the upper, auxiliary table can be moved for an additional distance depending on its length.

The auxiliary table always remains mounted on the main work table and supports the work being machined. The auxiliary table can be arranged to double the normal longitudinal range of movement of the main work table.

It is therefore a principal object of the invention to provide an auxiliary longitudinally movable horizontal work table for a machine tool used for milling, drilling, boring, tracing, etc.

A further object is to provide a machine tool having a main horizontal work table with an auxiliary work table on the main table and with means for adjustably positioning the auxiliary table longitudinally and angularly with respect to the main work table.

For further comprehension of the invention and of the objects and advantages thereof, reference will be had to the following description and accompanying drawings and to the appended claims in which the various novel features of the invention are more particularly set forth.

In the accompanying drawings forming a material part of the disclosure:

FIG. 5 is a reduced fragmentary front elevational view showing the mode of operation of the invention.

FIG. 6 is a reduced horizontal sectional view taken on line 6—6 of FIG. 4, showing how the auxiliary work table is angularly adjustable.

FIG. 7 is an enlarged exploded perspective view of parts of the angular adjustment means for auxiliary table.

Figure 1:
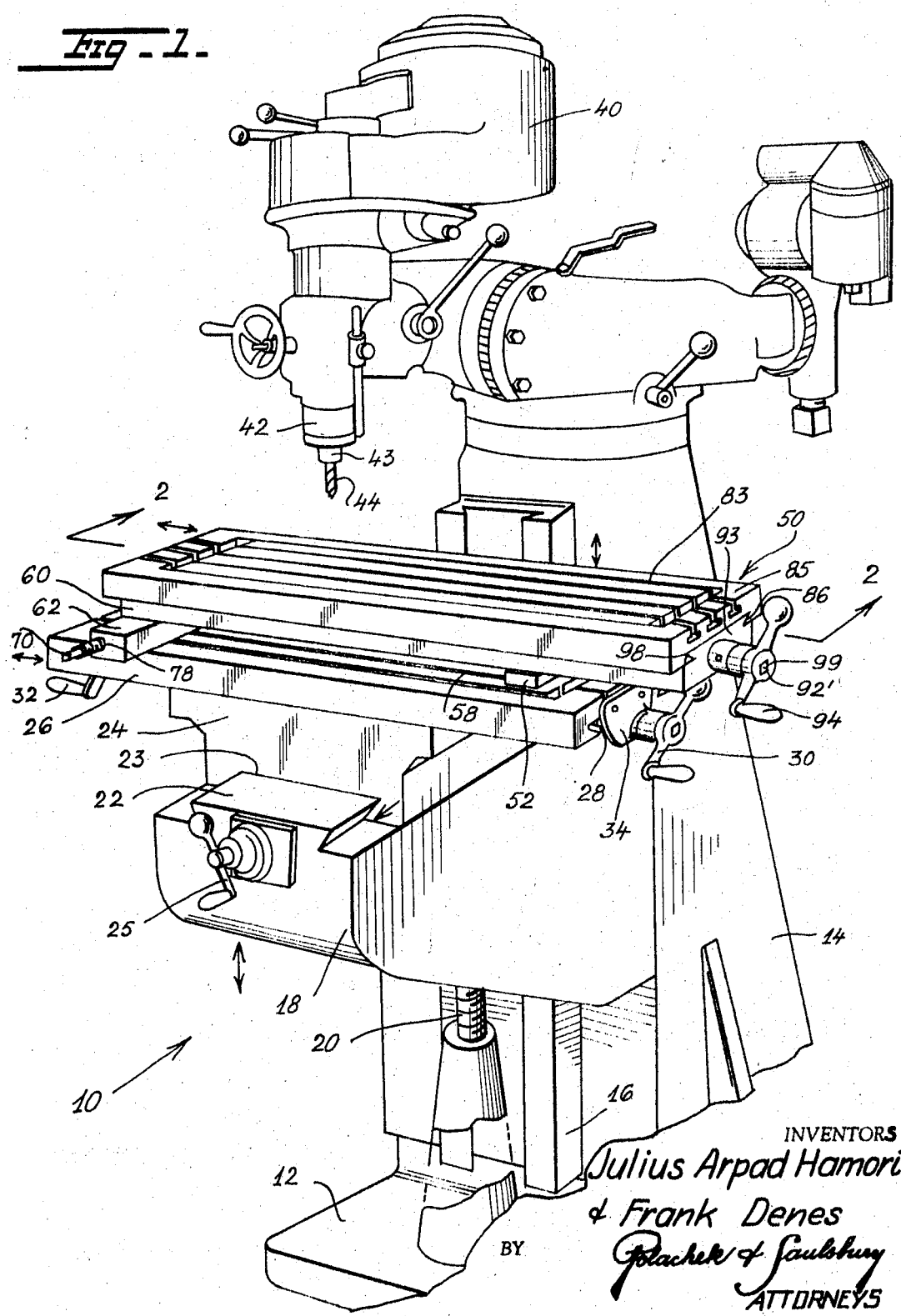
FIGURE 1 is a perspective view of a milling machine embodying the invention.

Referring to the drawings, there is shown a machine tool 10 which may be for a vertical milling machine. This machine has a base 12 on which is mounted a pedestal 14. The pedestal is provided with front rails 16 on which is vertically movable a knee 18. The knee can be driven by a motor driven screw 20. On knee 18 is a horizontal rail 22 extending perpendicularly to the pedestal. Guideway 23 of carriage 24 is fitted to the rail 22. Handle 25 turns a feed screw 25' for moving the carriage transversely in and out with respect to the pedestal. Carriage 24 carries a main horizontal work table 26. This table as clearly shown in FIGS. 1–4 is provided with a feed screw 28 rotated by crank handles 30, 32. Flanges 34 and 35 secured on ends of table 26 rotatably support the feed screw. The feed screw extends through a threaded bore 36 in carriage 24. When the feed screw 28 is turned the table 26 moves longitudinally on carriage 24 underneath head 40. The head has a motor driven spindle 42 carrying a chuck 43 in which is working tool 44 such as a drill bit or other suitable tool. By the arrangement described, the table 26 can be adjustable raised or lowered with knee 18. The table 26 can be moved horizontally in or out with carriage 24. The table can be moved longitudinally on carriage 24. The machine is thus provided with means for adjusting table 26 on three mutually perpendicular axes to position the table 26 properly for machine work by tool 44. To the extent described, the machine 10 is conventional.

Figure 2:
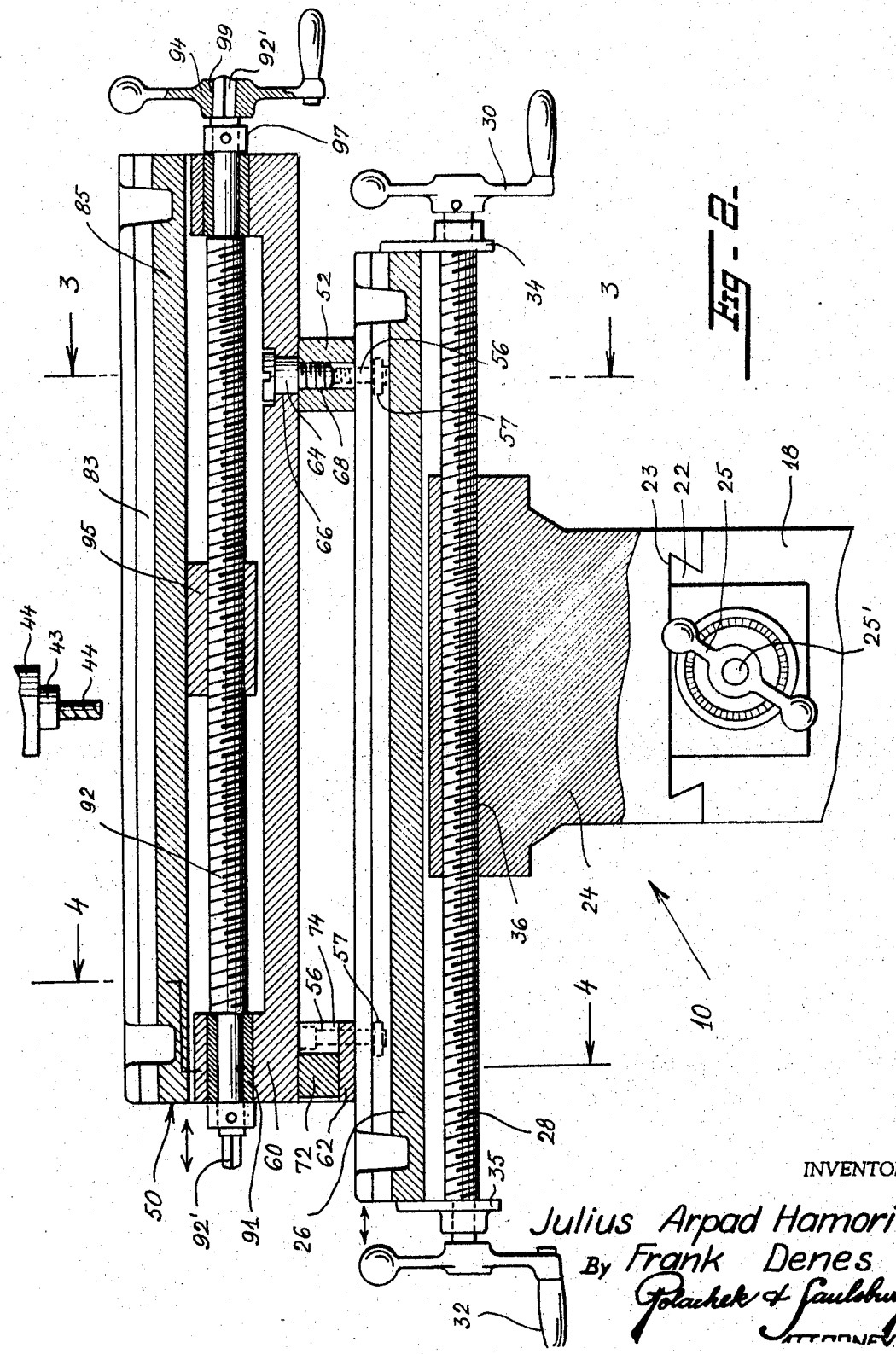
FIG. 2 is an enlarged vertical sectional view taken on line 2—2 of FIG. 1.
Figure 3:
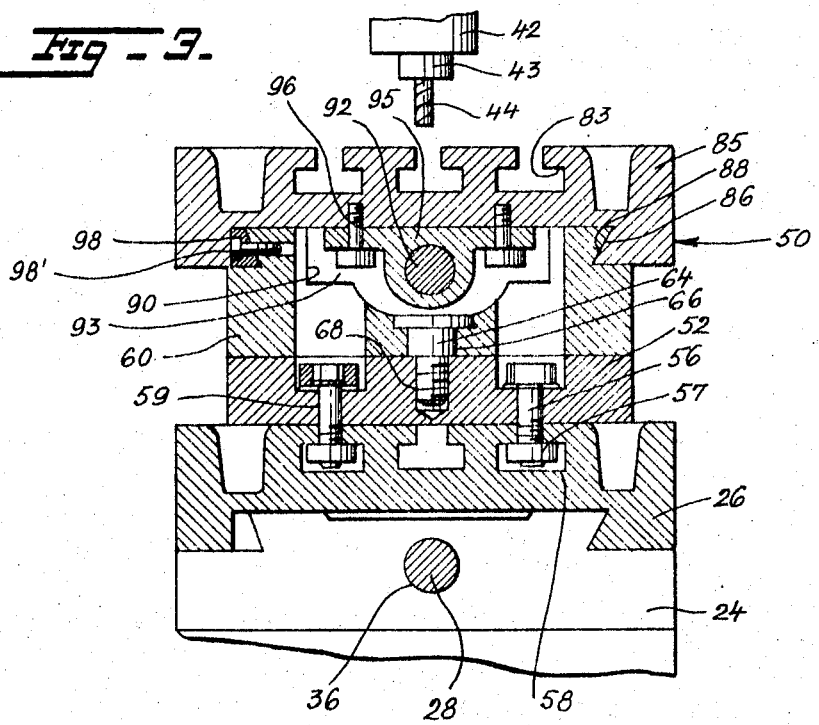
FIG. 3 and FIG. 4 are frangmentary vertical sectional views taken on lines 3—3 and 4—4 of FIG. 2.
Figure 4:
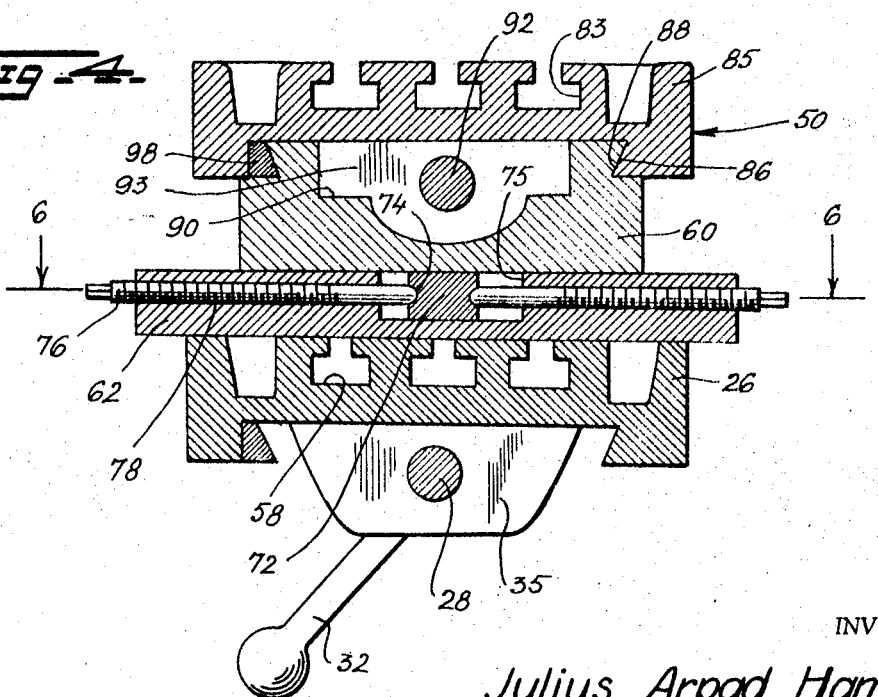

In accordance with the invention a removable auxiliary work table assembly 50 is adjustably mounted on table 26. Table assembly 50 has two bars or blocks 52, 62 mounted by means of bolts 56 and nuts 57 on table 26. The nuts are engaged in channel grooves or tracks 58 on table 26; see FIGS. 2 and 3. Bolts 56 are engaged in countersunk holes 59 in the blocks. A base plate 60 is mounted on blocks 52, 62. Block 52 is located near the right end of assembly 50 as seen in FIG. 2. Block 62 is disposed parallel to block 52 and is located near the left end of assembly 50. Blocks 52 and 62 extend transversely with respect to the pedestal and table 26. Bolts 56 and nuts 57 hold blocks 52, 62 in fixed position on and transversely of table 26.

A pivot bolt 64 is seated in a countersunk hole 66 in plate 60. This bolt is screwed into threaded hole 68 in block 52. Plate 60 can be pivoted to a limited extent in a horizontal plane around bolt 64. Attached to the underside of plate 60 by bolts 70 is a block 72 having dovetailed end recesses 74; see FIGS. 4, 6 and 7. This block is disposed in a rectangular recess 75 cut in the top of block 62. A pair of adjustment screws 76 extend through threaded holes 78 in block 62. The inner, rounded ends 80 of the screws 76 engage in recesses 74. It will be apparent that the position of block 72 in recess 75 can be adjusted by turning one screw 76 inwardly of recess 75 and the turning the other screw outwardly of the recess. By this arrangement the angular position of the base plate 60 with respect to the longitudinal direction of table 26 can be angularly adjusted.

Slidably mounted on top of base plate 60 is an auxiliary work table 85. This work table has undercut channel grooves or tracks 83 for receiving vises of conventional type for holding work pieces to be machined. Work table 85 is a rectangular plate at least as long as plate 60 and rectangular table 26. A mortised groove 86 is formed in the underside of table 85 and sides of this groove are slidably engaged with chamfered sides 88 of base plate 60. A longitudinally extending recess 90 is formed in the top of plate 60 through which extends feed screw 92. Ends of the feed screw are rotatably journaled in bearings 91 in end walls 93 of plate 60. A handle 94 is removably mounted on either one of stems 92' at opposite ends of feed screw 92 for turning this feed screw. The feed screw extends through a threaded block 95 secured by bolts 96 to the underside of table 85. Thus when the feed screw 92 is turned in one direction or another the table 85 will move longitudinally in one direction or another with respect to plate 60. Collars 97 on feed screw 92 at opposite ends of plate 60 keep the feed screw rotatably engaged with the base plate 60. A wedge bar 98 at one side of groove 86 secured by bolts 98' to plate 60 insures a snug sliding fit of table 85 on plate 60.

FIG. 5 shows in solid and dotted lines the range of adjustment of the main and auxiliary tables, and how the auxiliary table extends the working range of machine 10. Normally the main table 26 is adjustable longitudinally distance D1 between extreme left and extreme right positions. Plate 60 is movable through this same distance with table 26. Table 85 is movable through distance D2 plus D3 with respect to plate 60, and the total range of adjustment of table 85 is distance D4 which is equal to distance D1 plus distance D2 plus distance D3. It will be thus apparent from FIG. 5 that addition of assembly 50 to machine 10 can double the longitudinal range of adjustment of the work table which supports a workpiece under the working tool 44.

FIG. 6 shows in solid and dotted lines the total angular range of adjustment of table 85 with respect to table 26. Table 85 is movable laterally through angle A with plate 60 which pivots around bolt 64. This angular adjustment will be found very useful in performing certain angular cuts on workpieces without requiring repositioning of the workpieces in the vise or vises which hold them on table 85.

Once the various adjustment screws and leadscrews are set in desired position, the relative positions of the tables 85 and 26 remain fixed. To reset the work tables handle 30 or 32 can be turned to move the work table 26 with assembly 50 mounted on it from the extreme right to the extreme left position or vice versa. Then handle 94 can be turned to adjust table 85 between its extreme positions on base plate 60. Handle 94 has a tapered hole 99 which receives either stem 92' so that the handle 94 can be engaged on whichever end of the feed screw extends beyond plate 60.

There has thus been described an auxiliary table assembly for a machine tool having a main work table movable horizontally in one direction in its plane, the auxiliary table assembly serving to extend the working range of the machine by enabling movement of an auxiliary table a further distance in the same direction as that of the main work table. The invention is applicable to all types of machines and is not limited necessarily to milling machines.

Furthermore, the invention is not limited necessarily to horizontal work table, since it will serve to extend the working range of a table operated in a vertical plane or in an inclined plane. What is most important is that the invention provides an auxiliary table which becomes an integral, though removable part, of a machine tool. The invention is applicable to conventional machines without requiring any alteration in their construction. Mounting and operation of the auxiliary table assembly requires no particular skill or training or any special tools other than common wrenches.

We claim:

1. In a machine tool having a main work table adjustably movable in its plane in any one direction to carry a workpiece through a limited working distance with respect to a working tool, the improvement comprising an auxiliary table assembly, said assembly comprising an auxiliary work table for carrying the workpiece, means adjustably supporting said auxiliary work table on the main work table to move the auxiliary table in said one direction with respect to the main work table for extending the working distance through which said workpiece can be carried with respect to the working tool, said means comprising a base plate, said auxiliary table being slidably disposed on the base plate, a feed screw extending axially between the auxiliary table and base plate and rototably engaged in the ends of said base plate, a massive member secured to the auxiliary table, said member having a threaded portion receiving said feed screw, whereby the auxiliary table slides along the base plate when the feed screw is turned, block support means for removably securing the base plate to the main work table, means attaching said base plate to said block support means so that the base plate and auxiliary work table move with the main work table when the main table is moved in said one direction with respect to the working tool, said block support means are two blocks, a pivot bolt seated in a first one of said blocks and engaged with said base plate so that the base plate is angularly adjustable laterally with respect to the main work table, and means for holding the base plate in any set angular position on said blocks.

2. An auxiliary table assembly as recited in claim 1, wherein the second of said two blocks has means comprising a recess therein, a third supporting block having dovetailed grooves at its ends, said recess being longer than said third block and receiving said third block so that the same is movable in said recess in the second block, said third block being secured to the underside of said base plate so that the third block moves with the base plate during angular lateral adjustment thereof, and opposed adjustment screws carried by the second block and extending into said recess to contact said third block to hold the same in any position of adjustment thereof in said recess.

3. An auxiliary table assembly as recited in claim 1, wherein the auxiliary table is substantially as long as the base plate, said feed screw having stems extending outwardly of opposite ends of the base plate, and a handle removably engaged on either one of the stems for turning the feed screw and slidably moving the auxiliary table over the base plate.

References Cited

UNITED STATES PATENTS 1,443,899    1/1923    Kusold _____ 90—58
1,511,141    10/1924    Scott et al. _____ 90—58
3,133,470    5/1964    Sipos _____ 51—240X ANDREW R. JUHASZ, Primary Examiner G. WEIDENFELD, Assistant Examiner U.S. Cl. X.R.

51—240